United States Patent
Le et al.

(10) Patent No.: US 7,277,266 B1
(45) Date of Patent: Oct. 2, 2007

(54) LIGHTNING PROTECTION SYSTEM FOR COMPOSITE STRUCTURE

(75) Inventors: Quynhgiao N. Le, Bellevue, WA (US); Ron Murakami, Edgewood, WA (US); Eric R. Steele, Kent, WA (US); James F. Kirchner, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/277,888

(22) Filed: Mar. 29, 2006

(51) Int. Cl.
*H05F 3/00* (2006.01)
(52) U.S. Cl. ...................................... 361/218
(58) Field of Classification Search ................. 361/218
See application file for complete search history.

(56) References Cited

U.S. PATENT DOCUMENTS

2005/0150596 A1 7/2005 Vargo et al.
2005/0181203 A1* 8/2005 Rawlings et al. ........... 428/337

FOREIGN PATENT DOCUMENTS

WO   WO 2004/106160   * 12/2004

OTHER PUBLICATIONS

Mailgate: sci.aeronautics.airliners: Re: A380 and Glare, mailgate.superneva.it/sci/sci.aeronautics.airliners/msg00238.html, Mar. 12, 2005.

* cited by examiner

*Primary Examiner*—Stephen W. Jackson
*Assistant Examiner*—Lucy Thomas
(74) *Attorney, Agent, or Firm*—Law Office of Charles W. Peterson, Jr.

(57) ABSTRACT

A lightning protection system for protecting composite structures and a method of protecting composite structures from lightning strikes. A dielectric ply is fixed above and completely covers metal surface features, e.g., skin fasteners through a composite skin to a wing fuel tank. A conductive ply is fixed above and completely covers the dielectric ply and extends to an external connection to a platform ground. The conductive ply directs current from lightning strikes away from metal surface features, e.g., to the platform ground. Both plies may be adhesively backed and sequentially pressed into place.

24 Claims, 2 Drawing Sheets

LIGHTNING PROTECTION SYSTEM FOR COMPOSITE STRUCTURE

CROSS REFERENCE TO RELATED APPLICATION

The present invention is related to Published U.S. Patent Application No. 20050181203, entitled "Appliqué" to Diane C. Rawlings et al., assigned to the assignee of the present invention.

BACKGROUND OF THE INVENTION

1. Field of the Invention

The present invention generally relates to protecting composite structures from lightning strikes, and more particularly, to an appliqué for protecting composite aircraft from lightning strikes.

2. Background Description

Since aluminum and other metals are highly conductive, a transient charge from a lightning striking a metal body discharges into the metal body with current from the discharge being distributed relatively evenly over the body. So, a typical lightning strike to a metal aircraft causes no or only minor damage to aircraft components. However, carbon fiber composites generally have a higher strength-to-weight ratio than aluminum, and so, are increasingly replacing aluminum structural components. Unfortunately, typical state of the art composites, such as Carbon Fiber Reinforced Plastic (CFRP), are approximately 2000 times more resistive than aluminum.

So, a lightning strike that may have little or no effect on an aluminum structure may affect unprotected CFRP components. For adequate lightning protection for a composite wing structure, the exterior CFRP structure must withstand not only the initial lightning strike, but also at least one hundred kiloamperes (100 kA) of discharge current without adverse affects or impact to safety. Furthermore, skin fasteners at an exposed surface are most susceptible to a direct strike. Accordingly, composite structure aircraft must have some protection, especially at exposed skin fasteners, fuel and hydraulic couplings. However, it is also important that this protection is economically feasible, in its initial application, in its effectiveness for minimizing resulting damage and, in subsequent consequent repair or replacement, both for continued aircraft flightworthiness and to meet economic repair targets.

Unfortunately, typical lightning strike protection approaches are complicated and difficult to implement in CFRP. One approach involves selectively integrating metal (e.g., copper foil) into or onto the composite laminate at the fastening areas. Moreover, this new approach has been expensive; is often difficult to implement/rework with labor intensive application processes both pre and post-assembly; and, has not consistently exhibited acceptable EME protection. Copper foils, for example, have been subject to wrinkling during lay-up/cure. Drilling the laminate for fastener installation may contaminate the fuel tank with copper. Even with this additional protection, in the absence of other supporting protection (e.g., fastener collar isolation, fillet/cap sealing), the structure may still have a low sparking threshold. In addition to added complexity, integrating a conductive surface protection layer into the composite wing skin may carry with it an unacceptable weight penalty.

Thus, there is a need for effective lightning protection for composite structures that is lightweight, relatively low-cost, as well as simple to apply and repair, and especially for such lightning protection for composite aircraft.

SUMMARY OF THE INVENTION

An embodiment of the present invention reduces lightning strike affects to aircraft and in particular, to composite surfaces. Thus, an embodiment of the present invention simplifies protecting composite aircraft and in particular wing fuel tanks from lightning strikes, and simplifies repairing of damage to the aircraft lightning strike protection system.

More particularly, embodiments of the present invention include a lightning protection system in a lightning protection appliqué, an aircraft including the lightning protection system and method of protecting an aircraft from lightning strikes. A dielectric ply is fixed (e.g., bonded) above and completely covers metallic skin fasteners. A conductive ply is fixed (e.g., bonded) above and completely covers the dielectric ply and extends to an external connection, e.g., to a platform ground. The conductive ply directs lightning discharge current away from critical areas. Both plies may be adhesively backed and sequentially pressed into place.

Advantageously, a preferred lightning protection appliqué provides flexibility in lightning protection design without increasing aircraft weight appreciably and with superior performance and protection. Appliqué dielectric and conductor layers are simply sequentially pressed in place on the skin to avoid adding an embedded conductive layer or requiring a conductive surface protection layer for a CFRP skin. Thus a preferred lightning protection system simplifies aircraft skin design while reducing weight. In addition to weight, cost savings are realized from simple dielectric and conductor layer manufacturing requirements, as well as maintenance simplicity. Although age may make removal increasingly difficult, an entire preferred appliqué may be replaced by peeling the old ply(plies) off and pressing a new one(s) in place.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
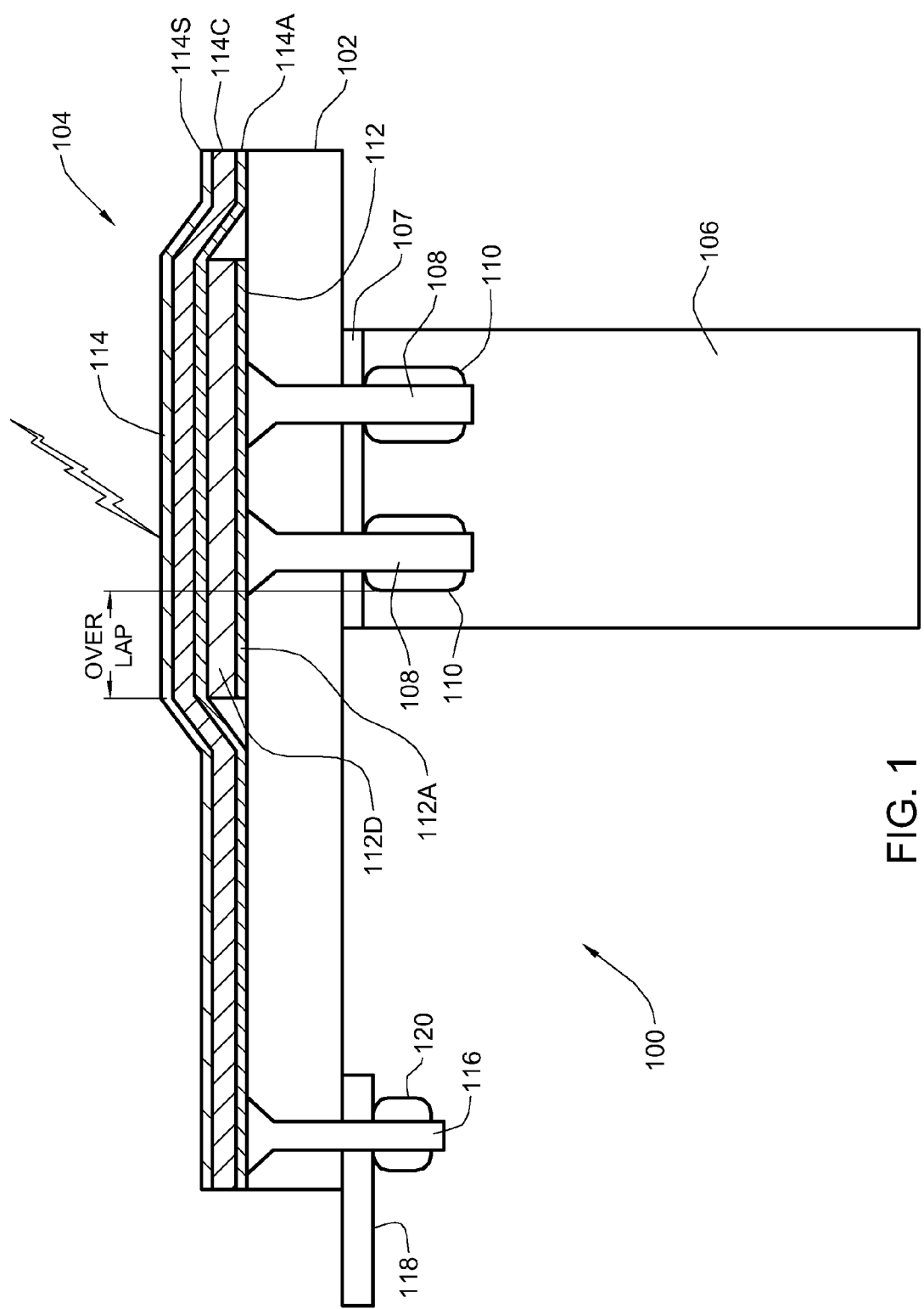
FIG. 1 shows an example of an aircraft skin cross section through the wing with lightning protection appliqué (LPA) according to an advantageous embodiment the present invention.

Turning now to the drawings and more particularly, FIG. 1 shows an example of a lightning protection system according to a advantageous embodiment of the present invention in a cross section 100 of an aircraft. In this example, the cross section 100 is taken through the composite skin 102, e.g., a Carbon Fiber Reinforced Plastic (CFRP) skin, of the aircraft wing, protected by a preferred embodiment Lightning Protection Appliqué (LPA) 104. The composite skin 102 is fastened to a rib (metal or CFRP) 106 or similarly to a spar (CFRP), by skin fasteners 108 extending through the skin 102 and shear tie flange 107, held in place by collars or nuts 110. In this example, the cross section 100 is part of a fuel tank of a wing section. Although shown in this example protecting skin fasteners 108 at a wing fuel tank, this is for example only. A preferred LPA 104 may be used to protect any composite structure surface area where metal is exposed at the skin surface and so, is exposed to similar lightning threat levels, including other areas of a composite aircraft.

Preferably, the lightning protection appliqué 102 includes a dielectric ply 112 electrically isolating and insulating the skin fasteners 108, e.g., from a lightning strike, and a conductive ply 114 diverting electrical energy from such a lightning strike away from the isolated skin fasteners 108. Further, the conductive ply 114 extends at least 1.0" (2.54 cm) beyond the dielectric ply 112 at the skin fasteners 108, in this example to a ground contact 116, e.g., a bolt or rivet, that is separated from the skin fasteners 108 and located away from the fuel tank. The ground contact 116 is connected to a platform ground 118 and held in place by suitable attachment 120, e.g., a nut. Alternately, the conductive ply 114 is selected large enough that the lightning strike current dispersed around the surface of the structure to what are non-critical areas and without connecting the conductive ply 114 to platform ground 118.

The dielectric ply 112 may be, for example, a suitable electrically insulating or dielectric film 112D of an appropriate thickness, e.g., 0.003" to 0.010" (0.076-0.254 mm) and an attachment backing 112A, e.g., of pressure sensitive adhesive, preferably, 0.002" (0.050 mm) thick. The specific material selected for electrically insulating dielectric film 112D depends on the intended installation conditions and the system's design. For demanding environments or designs where paint is not intended over the appliqué, the selected insulating material may be a film of a fluoropolymer such as for example polytetrafluoroethylene (PTFE); or a terpolymer of tetrafluoroethylene, hexafluoropropylene, and vinylidene fluoride (THV); or fluorinated ethylene propylene (FEP); or perfluoroalkoxytetrafluoroethylene (PFA). For applications where painting the appliqué may be desired or necessary, polyester, polyimide, or polyurethane films may be more appropriate to facilitate paint adhesion.

The conductive ply 114 in this example includes a conductive center layer 114C sandwiched between and encapsulated by a protective surface layer 114S and an attachment backing 114A. Preferably, the conductive center layer 114C includes a 0.001" to 0.004" (0.025-0.102 mm) thick metallic layer (solid or mesh) incorporated in an adhesive. The preferred protective surface layer 114S provides the conductive center layer 114C with partial environmental protection and promotes primer/top coat adhesion for subsequent painting, if necessary. Also, the preferred protective surface layer 114S is 0.002" to 0.004" (0.051-0.102 mm) thick electrically insulating film, that may be the same material as electrically insulating film 112D in the dielectric ply 112. The attachment backing 114A may be a layer of pressure sensitive adhesive, 0.002" to 0.008" (0.051-0.203 mm) thick. Both attachment backing 112A and 114A provide adhesion for attaching the respective ply 112, 114 to the underlying structure, i.e., CFRP skin, and/or the dielectric ply 112. The metallic layer in conductive center layer 114C may be incorporated in the same adhesive material. Also, a sealant may be applied along the edges of the plies 112, 114, e.g., to prevent chemical/environmental erosion.

The dielectric ply 112 is applied in a strip to the skin 102 covering all skin fasteners 108 in the area of exposure. If applicable, the dielectric ply 112 also covers any other exposed surface metal features. Since the dielectric ply strip 112 may be limited to only the area around surface metal such as skin fasteners 108, the strip 112 provides a significant weight saving over a more encompassing approach. Examples of such encompassing approaches include, for example, Published U.S. Patent Application No. 20050181203, entitled "Appliqué" to Diane C. Rawlings et al., and Published U.S. Patent Application No. 20050150596 entitled "Methods and Materials for Reducing Damage from Environmental Electromagnetic Effects" to Terrence G. Vargo et al., both of which are assigned to the assignee of the present invention and incorporated herein by reference. The overlap distance that the dielectric layer strip 112 must overlap surface metal depends on the skin resistance and the level of desired protection. However, preferably, for a state of the art CFRP and for a one hundred kiloampere (100 kA) lightning strike, the overlap is at least 1.8" (4.57 cm) to sufficiently isolate metallic surface features.

The conductive ply 114 has significantly greater area coverage than the dielectric layer strip 112 and is applied directly over the dielectric layer strip 112 and CFRP skin 102. Depending on design requirements, the preferred conductive ply 114 may cover the entire structure (e.g., aircraft or other composite structure) or only selected sections of the structure (e.g., selected sections of a composite wing or fuselage), e.g., for weight reduction. The conductive ply 114 provides a high current path to the platform ground 118 that directs current from lightning strikes away from the isolated skin fasteners 108 and through grounding studs 116 and nuts 120. So, the grounding studs 116 also must be spaced adequately away from the skin fasteners 108, depending upon skin 102 resistance and desired protection level. Thus, the conductive ply 114 overlaps and completely covers a significantly greater area than the dielectric ply 112. The much lower resistance of the conductive ply 114 assures that very little current, if any, flows through the isolated skin fasteners 108. So instead, substantially all of the effects of a lightning strike are directed well away the critical wing box section and so, away from the fuel tank. Accordingly, a preferred lightning protection appliqué 104 is capable of successfully meeting the lightning protection requirements for lightning strike zone 2 (100 kA) as set forth in SAE International standard No. ARP5412.

Figure 2:
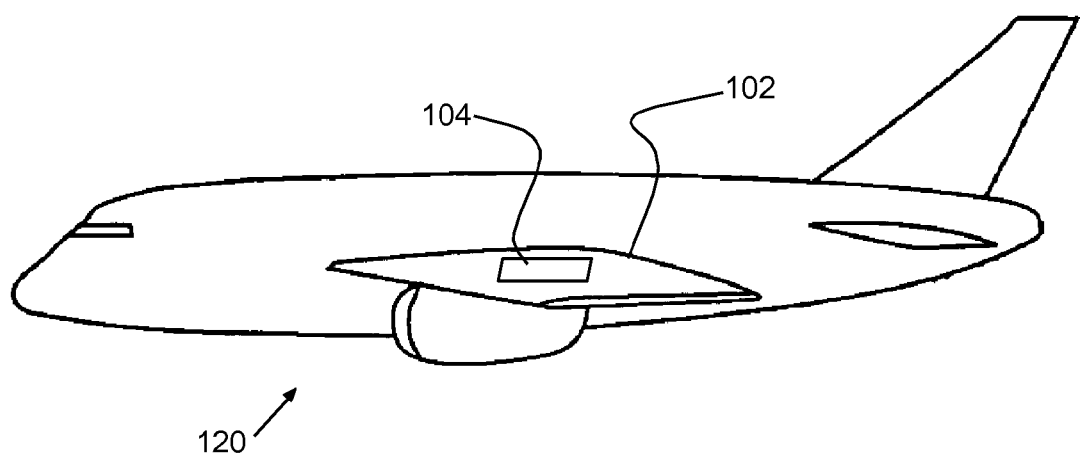
FIG. 2 shows an example of a preferred LPA attached to the wing of an aircraft.

FIG. 2 shows an example of an aircraft 120 with a preferred lightning protection appliqué (e.g., the LPA 104 of FIG. 1) fixed to the skin 102 of the wing, e.g., over metal features on the wing. As noted above, the metal features may be fasteners at the fuel tank. Moreover, since the preferred conductive ply provides this external high current path, it is unnecessary to add weight to the CFRP skin by including a conductive surface protection layer. Thus, the preferred embodiment lightning protection appliqué 104, which contains the lightning discharge protection, avoids the substantial weight of including a conductive surface protection layer. In particular, a preferred lightning protection appliqué 104 may be applied post-assembly after fastener installation and is easily inspected, maintained and replaced as necessary. Further, for a selective implementation, the preferred lightning protection appliqué 104 may also be uniquely configured/designed to satisfy the Electromagnetic Effect (EME) requirements for a particular lightning zone. Generally, a higher expected lightning discharge carries a higher current level and requires greater conductor thickness. So, the dielectric layer (112D, 114D in FIG. 1) thicknesses and the conductive element (114C in FIG. 1) thickness can be selected accordingly to satisfy the particular lightning protection requirement level of each particular lightning zone.

Advantageously, the preferred lightning protection appliqué provides flexibility in lightning protection design without increasing aircraft weight appreciably and with superior performance and protection. Instead of adding an embedded conductive layer or requiring a conductive surface protection layer for a CFRP skin, the dielectric and conductor layers are simply sequentially pressed in place on the skin. Thus the present invention simplifies aircraft skin design while reducing weight. In addition to weight, cost savings are realized from simple dielectric and conductor layer manufacturing requirements, as well as maintenance simplicity. An entire appliqué may be replaced by just peeling the old ply(plies) off and pressing a new one(s) in place.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

We claim:

1. A lightning protection system comprising:
   a dielectric ply fixed to a composite surface above and completely covering at least one metal surface feature, each said at least one metal surface feature being a protected feature; and
   a conductive ply fixed to said composite surface and electrically connected to any conductive unprotected feature, said conductive ply completely covering said dielectric ply, wherein current from lightning strikes is dispersed by said conductive ply.

2. A lightning protection system as in claim 1, wherein said dielectric ply and said conductive ply are fixed to a composite wing of an aircraft and said at least one metal surface feature includes a skin fastener.

3. A lightning protection system as in claim 2, wherein said conductive ply comprises:
   a protective surface layer;
   a conductive center layer; and
   an attachment backing layer adjacent to said conductive center layer and conductively attaching said conductive center layer to said composite wing, said conductive center layer being sandwiched between said protective surface layer and said attachment backing layer.

4. A lightning protection system as in claim 3, wherein said conductive ply consists of said protective surface layer, said conductive center layer and said attachment backing layer.

5. A lightning protection system as in claim 3, wherein said protective surface layer is a dielectric film, said conductive center layer includes a metallic layer and said attachment backing layer is layer of pressure sensitive adhesive.

6. A lightning protection system as in claim 5, wherein said metallic layer comprises a 0.001" to 0.004" (0.025-0.102 mm) thick metal mesh incorporated in an adhesive.

7. A lightning protection system as in claim 5, wherein said dielectric ply comprises:
   a layer of said dielectric film; and
   a pressure sensitive adhesive layer attaching said layer of dielectric film to said composite wing.

8. A lightning protection system as in claim 7, wherein said dielectric film is a film of dielectric material selected from a group of materials consisting of a fluoropolymer, a polyester, a polyimide, and polyurethane.

9. A lightning protection system as in claim 7, wherein said dielectric film in each said ply comprises a glass filler.

10. A lightning protection system as in claim 1, further comprising:
    a platform ground; and
    an external connection to said platform ground, said conductive ply contacting said external connection, current from lightning strikes dispersing through said platform ground.

11. A method of protecting a composite structure from lightning strikes, said method comprising the steps of:
    fixing a dielectric ply to a composite skin, said dielectric ply completely covering at least one metal surface feature, each said at least one metal surface feature being a protected feature; and
    fixing a conductive ply to said composite skin, said conductive ply covering said dielectric ply and electrically connected to any conductive unprotected feature, conductively connected to said composite skin and providing a ground path for current from lightning strikes.

12. A method of protecting a composite structure from lightning strikes as in claim 11, wherein the step fixing said dielectric ply comprises:
    selecting an exposed surface area on said composite skin, said exposed surface area encompassing said at least one metal surface feature;
    providing an adhesive backed dielectric film, said adhesive backed dielectric film being larger than said exposed surface area by a selected overlap amount; and
    applying said adhesive backed dielectric film to said exposed surface area, said adhesive backed dielectric film overlapping each said at least one metal surface feature by said selected overlap amount.

13. A method of protecting a composite structure from lightning strikes as in claim 12, wherein said composite structure is an aircraft, said composite skin is at a wing fuel tank and said at least one metal surface feature includes a plurality of skin fasteners, and the step of selecting said exposed surface area comprises determining a perimeter defined by said plurality of skin fasteners, said perimeter defining said exposed surface area.

14. A method of protecting a composite structure from lightning strikes as in claim 11, wherein the step of fixing said conductive ply comprises:
    providing an adhesive backed conductive layer, said adhesive backed conductive layer being larger than said dielectric ply by a selected amount and large enough to extend to an external connection to a platform ground; and
    applying said adhesive backed conductive layer over said dielectric ply and said external connection, wherein lightning striking said conductive ply is insulated from protected metal surface features by said dielectric ply and current from a lightning strike is diverted through said conductive ply to said platform ground.

15. A lightning protection system attached to a composite skin above metal surface features and outboard of a fuel tank, said lightning protection system protecting said fuel tank from lightning strikes, said lightning protection system comprising:
    at least one dielectric ply fixed above and completely covering one or more metal surface features;
    a platform ground path;
    a surface connection to said platform ground path; and
    a conductive ply fixed above and completely covering one said at least one dielectric ply and extending to said surface connection, said conductive ply directing current from lightning strikes to said platform ground path.

16. A lightning protection system as in claim 15, wherein said conductive ply comprises:

a protective surface layer;
a conductive center layer; and
an attachment backing layer adjacent to said conductive center layer and attaching said dielectric material layer to said composite skin, said conductive center layer being sandwiched between said protective surface and said attachment backing layer.

17. A lightning protection system as in claim 16, wherein said protective surface layer is a dielectric film, said conductive center layer includes a metallic layer and said attachment backing layer is layer of pressure sensitive adhesive.

18. A lightning protection system as in claim 17, wherein said dielectric film is a film of dielectric material selected from a group of materials consisting of a fluoropolymer, a polyester, a polyimide, and polyurethane.

19. A lightning protection system as in claim 17, wherein said metallic layer comprises a 0.001" to 0.004" (0.025-0.102 mm) thick metallic mesh incorporated in a 0.002" to 0.008" (0.050-0.210 mm) adhesive layer.

20. A lightning protection system as in claim 19, wherein said dielectric ply comprises:

a layer of said dielectric film; and
a pressure sensitive adhesive layer attaching said layer of dielectric film to said composite wing.

21. A lightning protection system as in claim 20, wherein each said dielectric film comprises a glass filler, said dielectric film in said conductive ply is 0.002" to 0.0035" (0.050-0.089 mm) thick, and said dielectric film in said dielectric ply is 0.003" to 0.010" (0.076-0.254 mm) thick.

22. A lightning protection system as in claim 21, wherein glass filler comprises a glass weave cloth.

23. A lightning protection system as in claim 21, wherein glass filler comprises glass particles.

24. A lightning protection system as in claim 19, wherein said composite skin is a portion of the wing of a composite aircraft outboard of a fuel tank and ones of said one or more metal surface features are skin fasteners penetrating said composite skin to said fuel tank and holding said composite skin in place.

* * * * *